Oct. 12, 1965   L. S. GAUMER, JR   3,210,951
METHOD FOR LOW TEMPERATURE SEPARATION OF GASEOUS MIXTURES
Filed Aug. 25, 1960                          2 Sheets-Sheet 1
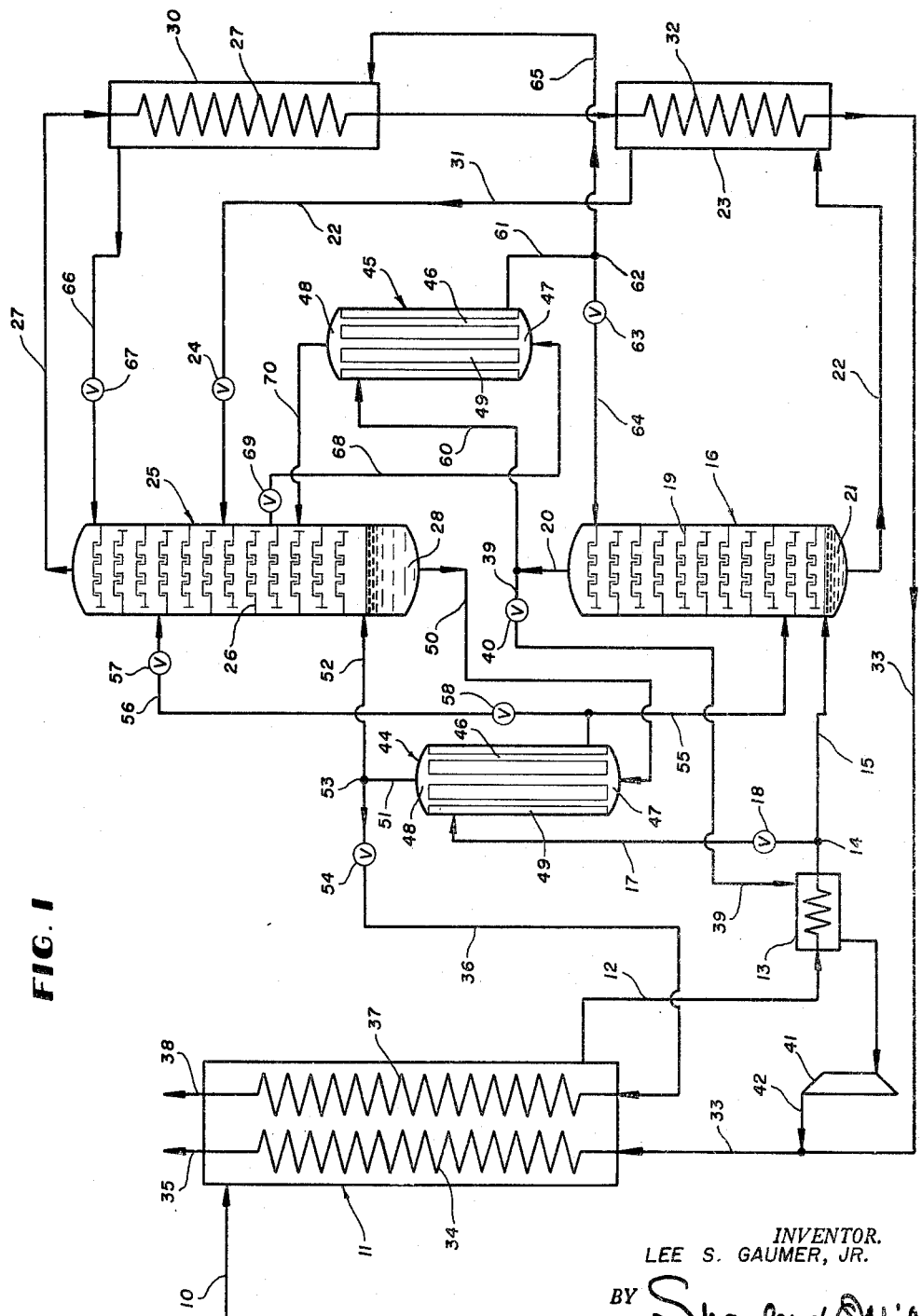
FIG. I
INVENTOR.
LEE S. GAUMER, JR.
BY Shanley & O'Neil
ATTORNEYS

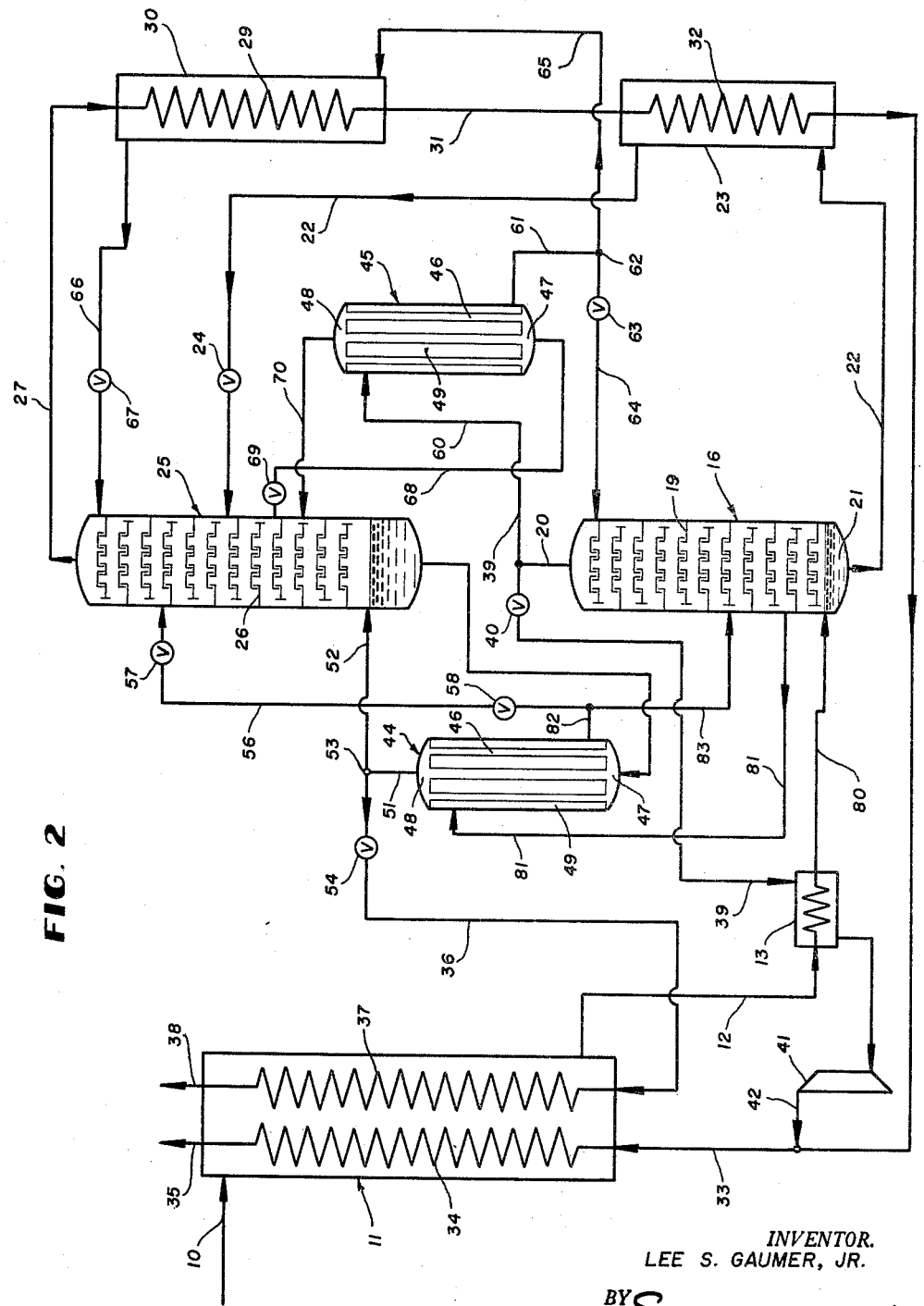

United States Patent Office 3,210,951
Patented Oct. 12, 1965

3,210,951
METHOD FOR LOW TEMPERATURE SEPARATION OF GASEOUS MIXTURES
Lee S. Gaumer, Jr., Allentown, Pa., assignor, by mesne assignments, to Air Products and Chemicals, Inc., Trexlertown, Pa., a corporation of Delaware
Filed Aug. 25, 1960, Ser. No. 51,847
15 Claims. (Cl. 62—29)

This invention relates to the separation of gaseous mixtures and more particularly to methods of and apparatus for fractionating gaseous mixtures under low temperature.

The power required to effect separation of gaseous mixtures includes the thermodynamic work of separation and an energy loss represented by the irreversibility of the processes required for the separation, such as the compression and fractionation processes. The irreversibility of the compression process constitutes a major portion of such energy loss while the irreversibility of the fractionation process comprises more than fifty percent of the energy loss due to irreversibility of the low temperature processes. The provision of a fractionation process which operates in a more reversible manner would not only reduce energy losses due to irreversibility of the low temperature fractionation processes but would decrease the required work of compression and thereby substantially reduce energy loss due to the irreversibility of the compression process.

The desirability of decreasing the irreversibility of the fractionating process has been appreciated in the past and theoretical studies have been made on ideal, reversible columns operating under hypothetical situations. Also, low temperature fractionating cycles have been proposed in which there is simultaneous heat and mass transfer between fractionating zones under different pressures with the view toward reducing the irreversibility of the fractionating process. In order to obtain the simultaneous transfer of heat and mass such cycles require unique, structurally complicated apparatus to form the fractionating columns. It is not known that such unique fractionating columns have been constructed and operated and there is a question with respect to their practicability and reliability. In any event, the complexity of the unique structures required would present serious manufacturing problems requiring a substantial capital investment as compared to conventional column structures, as well as maintenance problems, and the advantages gained by reduced power requirements would be materially nullified.

It is an object of the present invention to provide a novel method of and apparatus for separation of gaseous mixtures which reduces the irreversibility of the fractionation process to the degree theoretically obtainable by prior cycles without employing unique, structurally complicated apparatus, but by the novel use of well-known components employed in conventional low temperature separation cycles.

In general, the present invention provides an improved fractionating cycle employing first and second fractionating zones operating under different pressures, such as the conventional two-stage cycle employed for the separation of air into oxygen and nitrogen components. In the conventional two-stage cycle, one fractionating zone operates under superatmospheric pressure substantially corresponding to the pressure of the air feed and the second fractionating zone operates under lower pressure which may be slightly in excess of atmospheric pressure. The air feed undergoes preliminary separation in the fractionating zone under high pressure producing a liquid fraction consisting of crude oxygen and a gaseous fraction comprising substantially pure nitrogen, and the crude oxygen is fed to the low pressure fractionating zone where the separation is completed producing liquid oxygen component collecting in the base of the low pressure fractionating zone and gaseous nitrogen component withdrawn from the top of the column. The liquid oxygen and the high pressure nitrogen gas are brought into heat exchange effecting relation, by means of a condenser-evaporator which may form an integral part of the overall column structure joining the upper end of the high pressure fractionating column to the low end of the low pressure fractionating column or may comprise a two-pass heat exchange device referred to as an outside reboiler, physically located apart from the high pressure column and the low pressure column except for the required piping connections. The heat interchange between the liquid oxygen and the high pressure nitrogen gas results in partial vaporization of the liquid oxygen to provide reboil for the low pressure fractionating column while effecting liquefaction of the high pressure nitrogen which is used as reflux for the high pressure and the low pressure columns. The nitrogen is under high pressure relative to the oxygen because of the difference in the boiling points of oxygen and nitrogen and the pressure differential must be sufficiently great so that the heat interchange results in the degree of reboil and reflux production for efficient column operation. The air feed to the cycle is compressed to at least the pressure existing in the high pressure fractionating column and hence the power requirements of the conventional two-stage fractionating cycle are determined in part by the required operating pressure of the high pressure column established by the reboil and reflux requirements which relate to the degree of irreversibility of the fractionating process.

The present invention provides an improved cycle having two stages or zones of fractionation under different pressures and including two reboilers or condenser-evaporators. Both of the reboilers are interconnected with the stages of fractionation in such a manner as to effect the required reboil and reflux production with minimum pressure differential between the stages of rectification and also to decrease the irreversibility of the overall fractionation process thereby obtaining the desired separation with the high pressure stage operating under substantially reduced pressure, as compared to conventional cycles.

In particular, in accordance with the present invention, reboil for the low pressure fractionating zone is obtained by establishing heat interchange between liquid component collecting in the low pressure fractionating zone and relatively high pressure gaseous material comprising components of the gaseous mixture undergoing separation. This heat interchange results in such vaporization of the liquid component to provide the required reboil for the low pressure fractionating zone and at least partial liquefaction of the gaseous material which is introduced into the high pressure fractionating zone in such a manner as to reduce the irreversibility of the fractionation process occurring therein. The present invention also provides, in combination with the foregoing heat interchange, the establishing of a second and separate heat interchange between gaseous fraction collecting in the high pressure fractionating zone and relatively low pressure liquid material including components of the gaseous mixture undergoing separation. The second heat interchange effects liquefaction of the gaseous fraction to provide reflux for both the high pressure fractionating zone and the low pressure fractionating zone and also effects at least partial vaporization of the liquid material which is introduced into the low pressure fractionating zone in such a manner as to decrease the irreversibility of the fractionation process occurring therein. The gaseous material may comprise gaseous mixture prior to introduction into the fractionating operation or gaseous material withdrawn from the high pressure fractionating zone, and the liquid material may comprise liquid formed in the low pressure fractionating zone. The present invention also includes the feature of introducing part of the gaseous material liquefied upon the heat interchange with liquid component into a low pressure fractionating zone as feed to further improve efficiency of the fractionation process.

The foregoing and other objects and features of the present invention will be more fully understood from the following detailed description considered in connection with the accompanying drawings which disclose two embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views:

FIGURE 1 is a diagrammatic illustration of a low temperature separation cycle embodying principles of the present invention, and FIGURE 2 is a diagrammatic showing of a low temperature separation cycle constructed in accordance with another embodiment of the present invention.

With reference more particularly to FIGURE 1 of the drawings, a cycle embodying the principles of the present invention is disclosed therein for the separation of atmospheric air into oxygen and nitrogen components. Although the present invention is disclosed and described in the environment of atmospheric air separation, it is to be expressly understood that the principles of the present invention are not limited to air separation cycles but may be employed in the low temperature separation of other gaseous mixtures. As shown in FIGURE 1, atmospheric air, previously treated to remove moisture and carbon dioxide and compressed to a superatmospheric pressure, enters the cycle through a conduit 10 and is conducted thereby to the shell side of a heat exchange device 11 wherein the air flows in countercurrent heat exchange effecting relation with oxygen and nitrogen components, as described below, and is thereby cooled to a relatively low temperature which may approach saturation temperature of air at the existing pressure. The cooled air is withdrawn from the heat exchange device through conduit 12, passed through heat exchanger 13, the purpose of which is described below, and divided at point 14 into two portions; one portion flowing through conduit 15 to a high pressure fractionating column 16 and another portion being conducted by conduit 17 for a purpose that will be described in detail below. A control valve 18 is included in the conduit 17 to determine the percentages of the air feed constituting the two portions.

The high pressure column 16 may be of conventional construction including means for establishing intimate contact between upwardly flowing vapor and downwardly flowing liquid, such as a series of fractionating plates 19 provided with bubble caps as shown. The air undergoes preliminary separation in the high pressure column producing gaseous high boiling point fraction, that is, substantially pure nitrogen, which collects at the upper end of the column and is withdrawn through conduit 20, and liquid low boiling point fraction, i.e., crude oxygen, which collects in a pool 21 in the bottom of the column. Crude oxygen is withdrawn from the high pressure column by a conduit 22 and after flowing through subcooler 23 and expansion in valve 24 is introduced at an intermediate feed point in a low pressure fractionating column 25. The low pressure column 25 may also be of conventional construction and provided with suitable liquid-vapor contact means such as fractionating plates 26 of the bubble cap type. In the low pressure column, the separation of air is completed with nitrogen component in gaseous phase collecting at the upper end of the column and being withdrawn therefrom through conduit 27 and oxygen component collecting in liquid phase in a pool 28 formed in the base of the column.

Gaseous nitrogen component is conducted by the conduit 27 through passageway 29 of subcooler 30 and then by conduit 31 through passageway 32 of the subcooler 23. The gaseous nitrogen component then flows through conduit 33 to passageway 34 of the heat exchange device 11 for countercurrent heat exchange effecting relation with the incoming air as described above, the gaseous nitrogen component leaving the heat exchanger 11 through a conduit 35 at substantially ambient temperature. As will be described in detail below, oxygen component in gaseous phase is passed by way of a conduit 36 for flow through passageway 37 of the heat exchange device 11 in countercurrent heat exchange effecting relation with the air feed and the gaseous oxygen leaves the heat exchanger 11 through conduit 38 also at substantially ambient temperature. Refrigeration for the cycle may be obtained by expansion with work of a portion of the high pressure nitrogen gas withdrawn from the high pressure column through the conduit 20. As shown, a conduit 39, having a control valve 40, conducts a portion of the high pressure nitrogen gas for flow through the heat exchange device 13 and then to an expansion engine 41 and effluent of the expansion engine is conducted by conduit 42 and merged with the gaseous nitrogen product flowing in the conduit 33 to the heat exchange device 11. The heat exchange device 13 functions to warm the high pressure nitrogen gas so that liquid is not formed during the expansion process.

As mentioned above, the present invention provides a low temperature separation cycle in which energy losses due to irreversibility are substantially reduced by the combination of novel heat exchange steps uniquely related to a fractionation process taking place in a high pressure zone and a relatively low pressure zone. The novel heat exchange steps may be considered as separate condensing-evaporating steps both of which are associated with each of the fractionating zones. The first condensing-evaporating step comprises (a) establishing heat exchange between liquid component of the low pressure fractionating zone and gaseous material under relatively high pressure and including components of the gaseous mixture undergoing separation to effect vaporization of liquid component and at least partial liquefaction of the gaseous material, (b) utilization of vaporized liquid component to provide reboil for the low pressure fractionating zone and (c) untilization of liquefied gaseous material as downwardly flowing liquid in the high pressure fractionating zone. The second condensing-evaporating step comprises (a) establishing heat exchange between gaseous low boiling point fraction of the high pressure fractionating zone and liquid material under relatively low pressure and including components of the gaseous mixture to effect liquefaction of gaseous low boiling point fraction and vaporization of the liquid material, and (b) utilization of vaporized liquid material as upwardly flowing vapor in the fractionating zone.

The foregoing heat exchange steps are preferably accomplished by utilization of a pair of separate outside reboilers 44 and 45. It is to be expressly understood, however, as discussed below, that such heat exchange steps may be accomplished by the provision of heat exchange means located within the high pressure and low pressure fractionating zones. The reboilers 44 and 45 may each comprise a two-pass heat exchanger of conventional construction. As shown, one pass may be formed by a plurality of vertically disposed tubes 46 communicating with a lower chamber 47 and an upper chamber 48 and with the second pass comprising shell space 49 surrounding the tubes. Reboiler 44, which may be referred to as a liquid oxygen exaporator, receives liquid oxygen through a conduit 50 in liquid communication with the pool 28 and the chamber 47 and liquid oxygen vaporized in the reboiler 44 is returned to the column 25 through serially connected conduits 51 and 52 forming a vapor connection between the chamber 48 and the column above the pool 28. The conduits 51 and 52 and the oxygen product conduit 36, mentioned above, are joined at 53 and the latter conduit has a control valve 54. In the embodiment of FIGURE 1, gaseous material which effects vaporization of liquid oxygen fed to the reboiler 44 comprises that portion of the air feed flowing through the conduit 17 previously described. For this purpose, the conduit 17 communicates with the chamber 49 at the upper end of the reboiler 44, and the air cooled by heat interchange with liquid oxygen, at least partly in liquid phase, is withdrawn for the lower end of the chamber 49 through conduit 55 and introduced into the high pressure column 16 at a medial point. The quantity of air flowing through the chamber 49 of the reboiler 44 is sufficient not only to provide the required reboil for the low pressure column 25 but also to effect evaporation of that portion of the liquid oxygen which constitutes the liquid oxygen product of the cycle flowing through the conduit 36. If desired, a portion of the air cooled in the reboiler 44 may be conducted by conduit 56 and introduced into the low pressure column 25 after expansion in valve 57. A control valve 58 is provided to determine the quantity of cooled air thus passed to the low pressure column as feed.

The shell side or chamber 49 of the reboiler 45, which may be considered as the nitrogen condenser, is supplied at its upper end with high pressure gaseous nitrogen from the high pressure column 16 through a conduit 60 connected to the conduit 20. The high pressure nitrogen gas, liquefied in the reboiler 45 as described below, is withdrawn by way of conduit 61 and divided at point 62 with one portion, as determined by control valve 63, being conducted by conduit 64 to the top of the high pressure column 16 and there introduced as reflux, while the remaining portion is conducted by conduit 65, passed through the shell side of subcooler 30 and then through conduit 66 and expansion valve 67 for introduction into the top of the low pressure column as reflux. Liquefaction of high pressure gaseous nitrogen fed to the reboiler 45 is accomplished by passing liquid material withdrawn from the low pressure column 25 at a level below the feed point of the liquid crude oxygen and above the pool of liquid oxygen 28 by means of a conduit 68 communicating with the chamber 47 of the reboiler, a control valve 69 being provided in the conduit 68. Such liquid material is vaporized in the reboiler 45 while effecting liquefaction of high pressure nitrogen gas and the vaporized material flows from the upper chamber 48 and through conduit 70 into the low pressure column at a level below the conduit 68 and above the pool 28.

As an operational example of the cycle shown in FIGURE 1, air under a pressure of about 69 p.s.i.g. enters a cycle through conduit 10 and leaves the heat exchanger 11 or the heat exchange device 13 at or close to saturation temperature under the existing pressure such as about −283° F. Based on 100 mols of air entering the cycle in a given period of time, about 65 mols of air flow through conduit 15 to the high pressure column and about 35 mols of air flow through the oxygen product evaporator or reboiler 44. About 32 mols of liquid oxygen passes through the conduit 50 to the reboiler 44 and the resulting heat interchange effects vaporization of the liquid oxygen and liquefaction of the air. The 35 mols of liquefied air at about −288° F. is passed through the conduit 55 and is introduced into the high pressure column at a level where the liquid in the column is of corresponding composition. Of the 32 mols of vaporized liquid oxygen, about 21 mols pass through the conduit 36 as product and about 11 mols are returned through conduit 52 to the low pressure. About 69 mols of high pressure nitrogen gas is withdrawn from the high pressure column through the conduit 20 and of this quantity about 12 mols pass through conduit 39 to the expansion engine 41 and about 57 mols flow to the reboiler 45. The nitrogen gas is liquefied in the reboiler 45 and such liquefied nitrogen is divided for flow through conduits 64 and 65 to provide reflux for the high pressure and low pressure columns. About 53 mols of liquid material, comprising about 85% oxygen and having a temperature of about −298° F., is withdrawn from the low pressure column 25 through conduit 68 and conducted to the reboiler 45. Such liquid material is vaporized while effecting liquefaction of the high pressure nitrogen gas, and the vaporized liquid material at a temperature of about −292° F. returns to the high pressure column at a level in the low pressure column where the vapor is of corresponding composition. The crude oxygen in pool 21 has a composition of about 35% oxygen and is at a temperature of about −287° F. and is cooled to about −290° F. upon flowing through the subcooler 23 and after expansion in valve 24 to slightly in excess of atmospheric pressure is introduced into the low pressure column at a lower temperature. The reflux for the low pressure column is cooled to about −312° F. upon flowing through the sub-cooler 30 prior to expansion in the valve 67 to a lower pressure and temperature. The nitrogen gas withdrawn from the low pressure column 25 is at about −315° F. and such gas is warmed to about −291° F. upon flowing through subcooler 30 and then to about −290° F. upon flowing through subcooler 23. The oxygen product is of about 95% to 96% purity.

When a portion of the air liquefied in the reboiler 44 is used as feed for the low pressure column, the valve 58 is opened and adjusted so that of the 35 mols of air so liquefied about 17 mols are fed through conduit 55 to the high pressure column and about 17 mols are fed through conduit 56 and expansion valve 57 to the low pressure column at a level in which the column liquid is of corresponding composition. This feature of the invention makes it possible to achieve a more efficient distribution of trays in the low pressure column.

A conventional two-stage fractionating column capable of producing oxygen product of 95% to 96% purity would require the air entering the cycle to be compressed to about 90 p.s.i.a. It is thus seen that utilization of the principles of the present invention result in a substantial decrease in the work of compression required to effect the separation. When considering the production of oxygen product of 95% to 96% purity on a tonnage basis, such as the order of 500 tons per day, the magnitude of the advantages obtained from the present invention become manifest.

In the embodiment of the invention shown in FIGURE 2 of the drawings, the air after being cooled in the heat exchange device 13 flows through conduit 80 directly into the high pressure column 16 and gaseous material fed to the reboiler 44 for effecting vaporization of the liquid oxygen is derived from a medial point on the high pressure column 16. As shown, gaseous material is withdrawn from a medial point of the high pressure column through conduit 81 and conducted thereby to the upper end of the chamber 49 of the reboiler 44. Liquefied gaseous material is withdrawn from the bottom of the reboiler through conduit 82 and either passed in whole through conduit 83 to the high pressure column or with a part only being passed through the latter conduit to the high pressure column and another part conducted through the conduit 56 to the low pressure column.

The arrangement shown in FIGURE 2 of establishing heat exchange between gaseous material withdrawn from the high pressure column and liquid oxygen results in a substantial power saving as compared to conventional two-stage cycles but does not achieve the power savings obtained from the cycle shown in FIGURE 1. This is so since efficiency of the operation according to the present invention increases as the percentage of low boiling point component in the gaseous material decreases. It is to be expressly understood, however, as mentioned above, that the embodiment shown in FIGURE 2 provides advantages over the prior art in which gaseous nitrogen is used to evaporate the liquid oxygen. Moreover, the embodiment of FIGURE 2 demonstrates that the required liquid oxygen vaporization may be accomplished by establishing heat exchange between liquid oxygen and gaseous material including components of the gaseous mixture in which the percentage of high boiling component of the gaseous material is less than the percentage of high boiling point component in the liquid high boiling point fraction formed in the high pressure column.

In FIGURES 1 and 2, the liquid material passed to the reboiler 45 in heat exchange effecting relation with low boiling point gaseous fraction produced in the high pressure column is withdrawn from the low pressure column at a level below the crude oxygen feed level and above the pool 28 of liquid high boiling point product depending upon conditions within the low pressure column below the crude oxygen feed level. In the foregoing example of operation of the present invention for the separation of air, the liquid material withdrawn from the low pressure column and passed to the reboiler 45 may include from about 82% to 85% high boiling point oxygen component. However, in the separation of air to produce liquid oxygen of different purity, or in the separation of other gaseous mixture, the percentage of high boiling point component in the liquid material passed to the nitrogen condenser reboiler may be greater or less than the foregoing range of percentage composition depending upon conditions within the stripping portion of the low pressure column such as the required reflux ratio. In any event, the vaporized liquid material returned to the low pressure column from the nitrogen condenser reboiler is introduced into the low pressure column at a level such that the addition of heat reduces the irreversibility of the fractionating process.

Although the present invention is disclosed and described in the environment of air separation into oxygen and nitrogen components it is to be expressly understood, as mentioned above, that the principles of the present invention may be employed in connection with low temperature separation of other gaseous mixtures in two stages of fractionation under different pressures in which preliminary separation takes place in the higher pressure stage producing gaseous low boiling point fraction and liquid high boiling point fraction and in which the separation is completed in the lower pressure stage producing gaseous low boiling point component and liquid high boiling point component. Furthermore, the present invention is applicable to cycles for producing products in gaseous phase, as illustrated, as well as to cycles in which one or more of the products is produced in liquid phase and cycles in which a product is pumped in liquid phase to relatively high pressure and upon vaporization in heat exchange with the gaseous feed mixture is delivered from the cycle in gaseous phase under superatmospheric pressure. Moreover, the principles of the present invention are applicable to cycles in which the feed mixture is delivered to the cycle under different pressures, one of which may be greater than the pressure existing in the high pressure column. In such cycles, the principles of the present invention make it possible to reduce substantially the pressure of that portion of the feed mixture under relatively low pressure which usually comprises a major portion of the total feed mixture. In addition, it is to be expressly understood that the principles of the present invention do not depend upon and are unrelated to certain features or components shown in FIGURES 1 and 2. For example, instead of previously treating air to remove carbon dioxide and moisture, a switching type of heat exchange means may be provided in place of the heat exchanger 11 and such switching heat exchange means may be provided with any one of several unbalancing schemes known to the art, or the carbon dioxide and moisture may be removed by an adsorption process. In addition, refrigeration for the cycle may be obtained by expanding fluids of the cycle different from the high pressure nitrogen gas as illustrated, such as a high pressure air stream introduced into the cycle for that purpose. Also, other arrangements for warming the high pressure nitrogen stream prior to expansion could be employed and as an example the high pressure nitrogen stream could be passed in heat exchange with the air within the heat exchanger 11 and thus eliminate the need for the heat exchange device 13 and also provide an unbalancing stream for a switching heat exchange means if employed.

It is also to be expressly understood that the principles of the present invention may be practiced without employing outside reboilers for the oxygen evaporator and the nitrogen condenser. In particular, in place of the reboiler 44, a boiling coil could be placed in the bottom of the low pressure column in heat interchange with liquid oxygen in the pool 28 and connected in series with conduits 17 and 55 of FIGURE 1 or conduits 81 and 82 of FIGURE 2. Also, the reboiler 45 could be replaced by (a) providing a boiling coil in the low pressure column intermediate the feed point and the pool 28 of liquid oxygen and connected in series with conduits 60 and 61, or (b) by providing a condensing coil within the upper end of the high pressure column in series relation with the conduits 68 and 70.

It is therefore to be expressly understood that various changes and substitutions may be made in the embodiments of the invention disclosed herein without departing from the spirit of the invention as well understood by those skilled in the art. Reference therefore will be had to the appended claims for definitions of limits of the invention.

What is claimed is:

1. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone and utilization of further cooled gaseous material as feed in at least one of the fractionating zones, performing a second condensing-evaporating step including establishing heat exchange between first gaseous low boiling point fraction and liquid material of the operation to liquefy first gaseous low boiling point fraction and vaporize liquid material, the liquid material being under low pressure relative to the first gaseous low boiling point fraction and including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

2. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone and utilization of further cooled gaseous material as feed in at least one of the fractionating zones, withdrawing vaporized second liquid high boiling point component as product, performing a second condensing-evaporating step including establishing heat exchange between first gaseous low boiling point fraction and liquid material of the operation to liquefy first gaseous low boiling point fraction and vaporize liquid material, the liquid material being under low pressure relative to the first gaseous low boiling point fraction and including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

3. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone and utilization of further cooled gaseous material as feed in at least one of the fractionating zones, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

4. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaesous low boiling point fraction, performing a first condensing-evaporating step including establishing heat exchange between cold gaseous material and second liquid high boiling point fraction to vaporize second liquid high boiling point fraction and provide liquefied gaseous material, the first condensing-evaporating step including utilization of vaporized second liquid high boiling point fraction as reboil for the second fractionating zone and utilization of liquefied gaseous material as downwardly flowing liquid in at least one of the fractionating zones, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

5. Method of separating gaseous mixtures into component gases employing a low temperature fractionating operation including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and effect at least partial liquefaction of the gaseous material, the first condensing-evaporating step including utilization of vaporized second liquid high boiling point fraction as reboil for the second fractionating zone and utilization of partially liquefied gaseous material as feed in the first fractionating zone, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

6. Method of separating gaseous mixtures into component gases employing a low temperature fractionating operation including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to to separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone, expanding further cooled gaseous material and feeding gaseous material to the second fractionating zone, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

7. Method of separating gaseous mixtures into component gases employing a low temperature fractionating operation including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize liquid high boiling point component and provide further cooled gaseous material, the first condensing-evaporating step including utilization of vaporized second liquid high boiling point component as reboil for the second fractionating zone, feeding a part of further cooled gaseous material to the first fractionating zone, expanding a second part of further cooled gaseous material and feeding expanded gaseous material to the second fractionating zone, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, and utilizing liquefied first low boiling point fraction as reflux for the first and second fractionating zones.

8. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone and utilization of further cooled gaseous material as feed in at least one of the fractionating zones, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, the second condensing-evaporating step including utilization of vaporized liquid material as upwardly flowing vapor in the second fractionating zone, and utilizing liquefied first low boiling point fraction as reflux for the first and second fractionating zones.

9. Method of separating gaseous mixtures into component gases in a low temperature fractionating operation employing a plurality of fractionating zones in which preliminary separation takes place in a first fractionating zone under superatmospheric pressure producing first gaseous low boiling point fraction and first liquid high boiling point fraction and in which first liquid high boiling point fraction is fed to an intermediate point of a second fractionating zone under relatively low pressure for further separation producing second gaseous low boiling point fraction and second liquid high boiling point fraction collecting in a pool in the bottom of the second fractionating zone, comprising the steps of providing cool gaseous material under superatmospheric pressure from compressed gaseous mixture to be separated, the gaseous material including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between cold gaseous material and second liquid high boiling point fraction to vaporize second liquid high boiling point fraction and provide further cooled gaseous material, the first condensing-evaporating step including utilization of vaporized second liquid high boiling point fraction as reboil for the second fractionating zone and utilization of further cooled gaseous material as feed in at least one of the fractionating zones, performing a second condensing-evaporating step including establishing heat exchange between first gaseous low boiling point fraction and liquid material formed in the second fractionating zone below the intermediate point and above the pool of second liquid high boiling point fraction to liquefy first gaseous low boiling point fraction and vaporize liquid material, the second condensing-evaporating step including utilization of vaporized liquid material as upwardly flowing vapor in the second fractionating zone below the intermediate point, and utilizing liquefield first low boiling point fraction as reflux for the first and second fractionating zones.

10. Method of separating gaseous mixtures into component gases in a low temperature fractionating operation employing a plurality of fractionating zones including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of providing cool gaseous material under superatmospheric pressure from compressed gaseous mixture to be separated, the cold gaseous material being of a mass corresponding to the mass of the gaseous mixture to be separated and including components of the gaseous mixture with the percentage of high boiling point component being less than the percentage of high boiling point component of the first liquid high boiling point fraction and greater than the percentage of high boiling point component of the first gaseous low boiling point fraction, performing a first condensing-evaporating step including establishing heat exchange between a first part of cold gaseous material and second liquid high boiling point fraction to vaporize second liquid high boiling point fraction and provide further cooled first part of gaseous material, the first condensing-evaporating step including utilization of vaporized second liquid high boiling point fraction as reboil for the second fractionating zone, feeding a second part of gaseous material to the first fractionating zone, feeding further cooled first part of gaseous material to at least one of the fractionating zones, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, the second condensing-evaporating step including utilization of vaporized liquid material as upwardly flowing vapor in the second fractionating zone, and utilizing liquefied first low boiling point fraction as reflux for the first and second fractionating zones.

11. Method of separating gaseous mixtures into component gases employing a low temperature fractionating operation including preliminary separation in a first fractionating zone under superatmospheric pressure producing first gaseous low boiling point fraction and first liquid high boiling point fraction and a further separation in a second fractionating zone under relatively low pressure producing second gaseous low boiling point fraction and second liquid high boiling point fraction, comprising the steps of cooling compressed gaseous mixture and feeding compressed gaseous mixture to the first fractionating zone, performing a first condensing-evaporating step including establishing heat exchange between cold gaseous material formed in the first fractionating zone and second liquid high boiling point fraction to vaporize second liquid high boiling point fraction and provide further cooled gaseous material, the gaseous material including components of the gaseous mixture with the percentage of high boiling point component being less than the percentage of high boiling point component of the first liquid high boiling point fraction and greater than the percentage of high boiling point component of the first gaseous low boiling point fraction, the first condensing-evaporating step including utilization of vaporized second liquid high boiling point fraction as reboil for the second fractionating zone and utilization of further cooled gaseous material in the first fractionating zone, performing a second condensing-evaporating step including establishing heat exchange between first gaseous low boiling point fraction and liquid material formed in the second fractionating zone to liquefy first gaseous low boiling point fraction and vaporize liquid material, the liquid material including components of the gaseous mixture with the percentage of the high boiling point component being greater than the percentage of high boiling point component of the first liquid high boiling point fraction and less than the percentage of the high boiling point component of the second liquid high boiling point fraction, the second condensing-evaporating step including utilization of vaporized liquid material as upwardly flowing vapor in the second fractionating zone, and utilizing liquefied first low boiling point fraction as reflux for the first and second fractionating zones.

12. Method of separating gaseous mixtures in a low temperature operation, in which operation compressed and cooled gaseous mixture undergoes partial separation in a first fractionating zone under superatmospheric pressure producing gaseous low boiling point fraction and liquid high boiling point fraction and in which liquid high boiling point fraction is introduced at a feed point of a second fractionating zone under relatively low pressure where the separation is continued producing gaseous tops and liquid bottoms collecting in a pool below the feed point, comprising the steps of withdrawing liquid bottoms from the second fractionating zone and passing withdrawn liquid bottoms in heat interchange with relatively warm gaseous material to effect vaporization of liquid bottoms and cooling of the gaseous material, introducing vaporized liquid bottoms into the second fractionating zone, introducing cooled gaseous material into the first fractionating zone, withdrawing liquid material from a first space of the second fractionating zone located below the feed point and above the pool of liquid bottoms, passing withdrawn liquid material in heat exchange with gaseous low boiling point fraction to effect liquefaction of gaseous low boiling point fraction and vaporization of liquid material, introducing vaporized liquid material into the second fractionating zone at a second space located below the first space and above the pool of liquid bottoms, and utilizing liquefied gaseous low boiling point fraction as reflux for the first and second fractionating zones.

13. Method of separating air into oxygen and nitrogen component gases in a low temperature fractionating operation employing a plurality of fractionating zones including preliminary separation in a first fractionating zone under superatmospheric pressure producing first gaseous nitrogen fraction and liquid crude oxygen fraction and a further separation in a second fractionating zone under relatively low pressure producing second gaseous nitrogen fraction and liquid oxygen, comprising the steps of providing cool gaseous material under superatmospheric pressure from compressed gaseous mixture to be separated, the gaseous material including components of air with the percentage of oxygen component being less than the percentage of oxygen component of the liquid crude oxygen fraction and greater than the percentage of oxygen component of the first gaseous nitrogen fraction, performing a first condensing-evaporating step including establishing heat exchange between cold gasous material and liquid oxygen to vaporize liquid oxygen and provide further cooled gaseous material, the first condensing-evaporating step including utilization of vaporized liquid oxygen as reboil for the second fractionating zone and utilization of further cooled gaseous material as feed in at least one of the fractionating zones, performing a second condensing-evaporating step including establishing heat exchange between first gasous nitrogen fraction and liquid material of the operation to liquefy first gaseous nitrogen fraction and vaporize liquid material, the liquid material being under low pressure relative to the first gaseous nitrogen fraction and including components of air with the percentage of oxygen component being greater than the percentage of oxygen component of the liquid crude oxygen fraction and less than the percentage of oxygen component of the liquid oxygen, and utilizing liquefied first nitrogen fraction as reflux for the first and second fractionating zone.

14. Method of separating air into oxygen and nitrogen components in a low temperature operation, in which operation compressed and cooled air undergoes partial separation in a first fractionating zone under superatmospheric pressure producing gaseous nitrogen fraction and liquid crude oxygen fraction and in which liquid crude oxygen fraction is introduced at a feed point of a second fractionating zone under relatively low pressure where the separation is completed producing gaseous nitrogen component and liquid oxygen component collecting in a pool below the feed point, comprising the steps of withdrawing liquid oxygen component from the second fractionating zone and passing withdrawn liquid oxygen component in heat interchange with relatively warm gaseous material to effect vaporization of liquid oxygen component and at least partial liquefaction of gaseous material, introducing vaporized liquid oxygen component into second fractionating zone, introducing gaseous material following the last-named heat interchange into the first fractionating zone, withdrawing liquid material from a first space of the second fractionating zone below the feed point and above the pool of liquid oxygen component, passing withdrawn liquid material in heat exchange relation with gaseous nitrogen fraction to effect liquefaction of gaseous nitrogen fraction and vaporization of liquid material, introducing vaporized liquid material into the second fractionating zone at a second space located below the first space and above the pool of liquid oxygen component, and utilizing liquefied gaseous nitrogen fraction as reflux for the first and second fractionating zones.

15. Method of separating air into oxygen and nitrogen components in a low temperature operation, in which operation compressed and cooled air undergoes partial separation in a first fractionating zone under superatmospheric pressure producing gaseous nitrogen fraction and liquid crude oxygen fraction and in which liquid crude oxygen fraction is introduced at a feed point of a second fractionating zone under relatively low pressure where the separation is completed producing gaseous nitrogen component and liquid oxygen component collecting in a pool below the feed point, comprising the steps of withdrawing liquid oxygen component from the second fractionating zone and passing withdrawn liquid component in heat interchange with at least a portion of the compressed and cooled air to effect vaporization of liquid oxygen component and at least partial liquefaction of the air, introducing vaporized liquid oxygen component into the second fractionating zone, introducing compressed and cooled air following the last-named heat interchange into the first fractionating zone, withdrawing liquid material from a first space of the second fractionating zone below the feed point and above the pool of liquid oxygen component, passing withdrawn liquid material in heat exchange with gaseous nitrogen fraction to effect liquefaction of gaseous nitrogen fraction and vaporization of liquid material, introducing vaporized liquid material into the second fractionating zone at a second space located below the first space and above the pool of liquid oxygen component, and utilizing liquefied gaseous nitrogen fraction as reflux for the first and second fractionating zones.

References Cited by the Examiner

UNITED STATES PATENTS

| | | | |
|---|---|---|---|
| 1,604,240 | 10/26 | Schlitt | 62—29 |
| 1,607,321 | 11/26 | Van Nuys | 62—29 |
| 1,619,169 | 3/27 | Van Nuys | 62—29 |
| 2,513,306 | 7/50 | Garbo | 62—13 |
| 2,648,205 | 8/53 | Hufnagel | 62—13 |
| 2,664,719 | 1/54 | Rice | 62—14 |
| 2,833,127 | 5/58 | Vesque | 62—41 |
| 2,850,880 | 9/58 | Jakob | 62—13 |
| 2,895,304 | 7/59 | Wescherer | 62—13 |
| 2,913,882 | 11/59 | Schilling | 62—41 |
| 2,997,854 | 8/61 | Shilling et al. | 62—13 |

NORMAN YUDKOFF, *Primary Examiner.*

EDWARD J. MICHAEL, ROBERT A. O'LEARY,
*Examiners.*